(12) United States Patent
Pieretto et al.

(10) Patent No.: US 7,810,452 B2
(45) Date of Patent: Oct. 12, 2010

(54) BASIN CAPABLE OF CONTAINING AQUATIC ANIMALS, ESPECIALLY EXPERIMENTAL ANIMALS, AND RELATING HOUSING SYSTEM

(75) Inventors: Davide Pieretto, Gavirate (IT); Marco Brocca, Tradate (IT)

(73) Assignee: Tecniplast S.p.A., Buguggiate (IT)

( * ) Notice: Subject to any disclaimer, the term of this patent is extended or adjusted under 35 U.S.C. 154(b) by 480 days.

(21) Appl. No.: 11/485,141

(22) Filed: Jul. 12, 2006

(65) Prior Publication Data

US 2007/0012256 A1    Jan. 18, 2007

(30) Foreign Application Priority Data

Jul. 12, 2005    (EP)    ................................. 05425502

(51) Int. Cl.
*A01K 63/00* (2006.01)
*A01K 63/04* (2006.01)

(52) U.S. Cl. ................. 119/248; 119/417; 119/245; 210/167.21; 137/143

(58) Field of Classification Search ......... 119/245–269, 119/200, 228, 226, 223, 224, 207, 417, 418; 137/143, 146; 210/167.21, 167.25, 257.1, 210/418; D30/101–107
See application file for complete search history.

(56) References Cited

U.S. PATENT DOCUMENTS

| 3,390,665 | A | * | 7/1968 | Wininger .................... 119/254 |
|---|---|---|---|---|
| 3,565,043 | A | * | 2/1971 | Carmouche et al. ......... 119/228 |
| 3,669,297 | A | * | 6/1972 | Willinger ...................... 210/94 |
| 3,774,575 | A | | 11/1973 | Patterson |
| 4,681,131 | A | * | 7/1987 | Uriarte .................. 137/247.35 |
| 5,171,438 | A | * | 12/1992 | Korcz ..................... 210/167.22 |
| 5,450,818 | A | * | 9/1995 | Caillouet ..................... 119/223 |
| 5,779,884 | A | | 7/1998 | Raymo |
| 5,823,144 | A | * | 10/1998 | Edstrom et al. ............. 119/475 |
| 6,056,886 | A | * | 5/2000 | Hickok et al. ............... 210/776 |
| 6,125,791 | A | * | 10/2000 | Gundersen et al. .......... 119/228 |
| 6,257,170 | B1 | * | 7/2001 | Gundersen .................. 119/228 |
| 2002/0066414 | A1 | * | 6/2002 | Hallock et al. .............. 119/248 |

FOREIGN PATENT DOCUMENTS

EP    0616766 A2    3/1994

* cited by examiner

*Primary Examiner*—Andrea M Valenti
(74) *Attorney, Agent, or Firm*—Simpson & Simpson, PLLC

(57) ABSTRACT

A basin including: a front housing compartment (1) in which there is a lower point (3) for collecting the organic material to be removed; an equipment compartment (4) at the back of the basin, connected to the housing compartment; a drainage device, in the equipment compartment (4), which includes an "overflow" pipe (6) fixed to a siphon (7); the drainage device being capable of moving down in order to operate the siphon (7); and, a partition (8) between the housing compartment (1) and the equipment compartment (4), the partition being capable of keeping the animals inside the housing compartment and letting the water pass into the equipment compartment.

17 Claims, 4 Drawing Sheets

BASIN CAPABLE OF CONTAINING AQUATIC ANIMALS, ESPECIALLY EXPERIMENTAL ANIMALS, AND RELATING HOUSING SYSTEM

CROSS REFERENCE TO RELATED APPLICATIONS

This patent application claims priority of European Patent Application No. 05425502.01 filed Jul. 12, 2005, which application is incorporated herein by reference.

FIELD OF THE INVENTION

The present invention relates to a basin capable of containing aquatic animals—especially experimental animals—and to a housing system for one or more of said basins.

BACKGROUND OF THE INVENTION

At present, experimental aquatic animals subjected to experimental studies are contained in different types of basins with different dimensions; these basins are full of water and are normally placed on special structural shelves.

The conservation of the liquid level inside the basins is normally ensured by a series of faucets—usually one for each basin—whereby the inlet water flow can be adjusted. These faucets are housed on the supporting structure and connected to a central water filtering and sanitation system.

The redundant liquid is evacuated from the basin with devices that can have different types of operation concepts but mainly serve to eliminate organic materials which develop during farming of animals.

Some devices include a partition which allows water to pass from the farming environment to the discharge compartment through a narrow opening located at the bottom of the basin; when forced to pass through a reduced section, the water is subjected to an acceleration generating a flow which carries away the organic material.

Other devices, such as the one described in U.S. Pat. No. 6,588,371, make use of a system which deals with an open-close valve located on the drain. However, the basins are always equipped with an "overflow" device, whereas the water coming out of the basins is collected in gutters and conveyed towards a drain tank which is used for the next treatments.

The effectiveness of the various basin cleaning systems associated with the drainage system tends to decrease with time due to the organic material and algae growth occluding the passages. Therefore, the basin always needs to be serviced periodically by an operator in order to retrieve its normal operating conditions.

The basins are sometimes equipped with additional basins as well as different types of accessories in order to help animal breeding.

Operators removing basins from the structure normally involves closing the water inlet faucet, hence failing to maintain the flow rate adjustment and, oftentimes, to disconnect the inlet pipe from the basin lid.

However, the rehousing may be difficult for the operator, especially if it has to be carried out on high shelves and if the water inlet pipe needs to be reconnected to the basin lid.

Animal feeding represents one of the most burdensome points for stock farmers because it is normally carried out manually, even up to three times a day, by introducing the feed into the basin through the holes in the lid.

SUMMARY OF THE INVENTION

Therefore, the purpose of the present invention is to overcome all the above-mentioned drawbacks and to indicate a basin capable of containing aquatic animals—especially experimental animals—and a housing system for one or more of said basins, which should be particularly optimized in order to rationalize occupied spaces, maintenance programs and automate the utilization processes.

A first subject of the invention is a basin capable of containing aquatic animals—especially experimental animals—characterized in that it comprises: a front housing compartment in which there is a lower point for collecting the organic material to be removed; an equipment compartment at the back of the basin, connected to said housing compartment; a drainage device, in said equipment compartment, which comprises an "overflow" pipe fixed to a siphon, in which there is a small, calibrated hole around the top of said siphon; said drainage device being capable of moving down in order to operate said siphon; a partition between said housing compartment and said equipment compartment, said partition being capable of keeping the animals inside the housing compartment and letting the water pass into the equipment compartment.

A further subject of the invention is a housing system for one or more basins, characterized in that it comprises: shelves with guides used for housing one or more of said basins; a water distribution system with at least one termination for each of the said basins; a faucet associated with each termination for the flow rate adjustment of the water going into said basins; a piston switch device capable of moving down or up, downstream of each faucet, respectively, in order to deliver or interrupt the water flow; a wedge for each position of one or more of said basins, placed near the top and at the back of the basin, when inserted in the housing system.

A still further subject of the invention is a faucet for a housing system for one or more basins capable of containing aquatic animals, especially experimental animals, said housing system comprising shelves with guides used for housing one or more of said basins, and a water distribution system with at least one termination for each of the said basins; wherein said faucet is associated with each termination for the flow rate adjustment of the water going into said basins, and comprises a piston switch device capable of moving down or up, downstream of each faucet, respectively, in order to deliver or interrupt the water flow going into said basins.

The present invention relates in particular to a basin capable of containing aquatic animals, especially experimental animals, to a housing system for one or more of said basins, and to a faucet for a housing system, as described more fully in the claims, which are an integral part of this description.

BRIEF DESCRIPTION OF THE DRAWINGS

The purposes and advantages of this invention will become clear from the following detailed description of a preferred embodiment (and the relative alternative forms of embodiment) and the drawings that are attached hereto, which are merely illustrative and not limitative, in which.

In the drawings the same reference numbers are used to identify the same elements.

DETAILED DESCRIPTION OF THE PREFERRED EMBODIMENT

Figure 1:
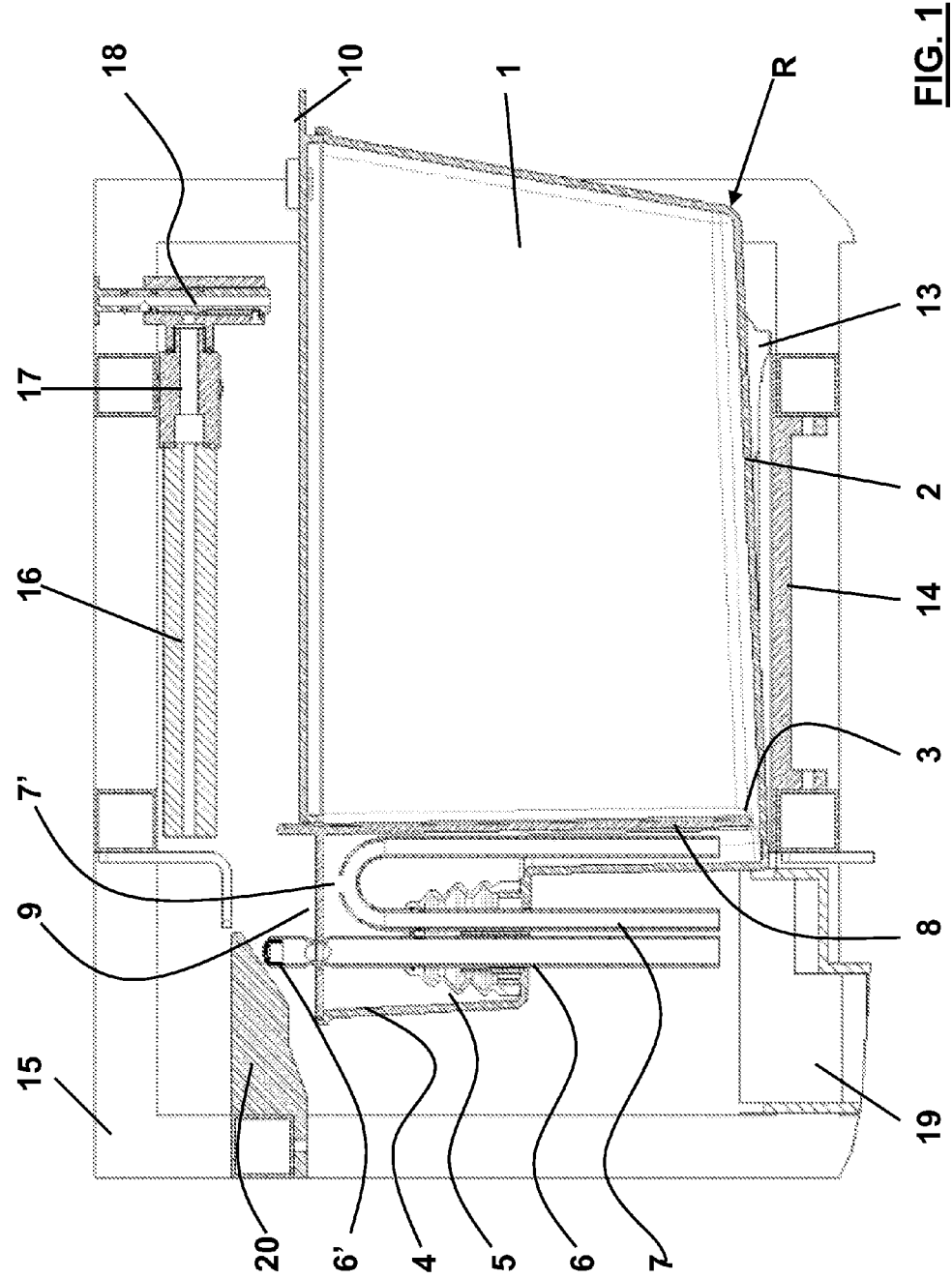
FIG. 1 shows a sectional side view of the basin, according to this invention, when extracted from the housing system.
Figure 2:
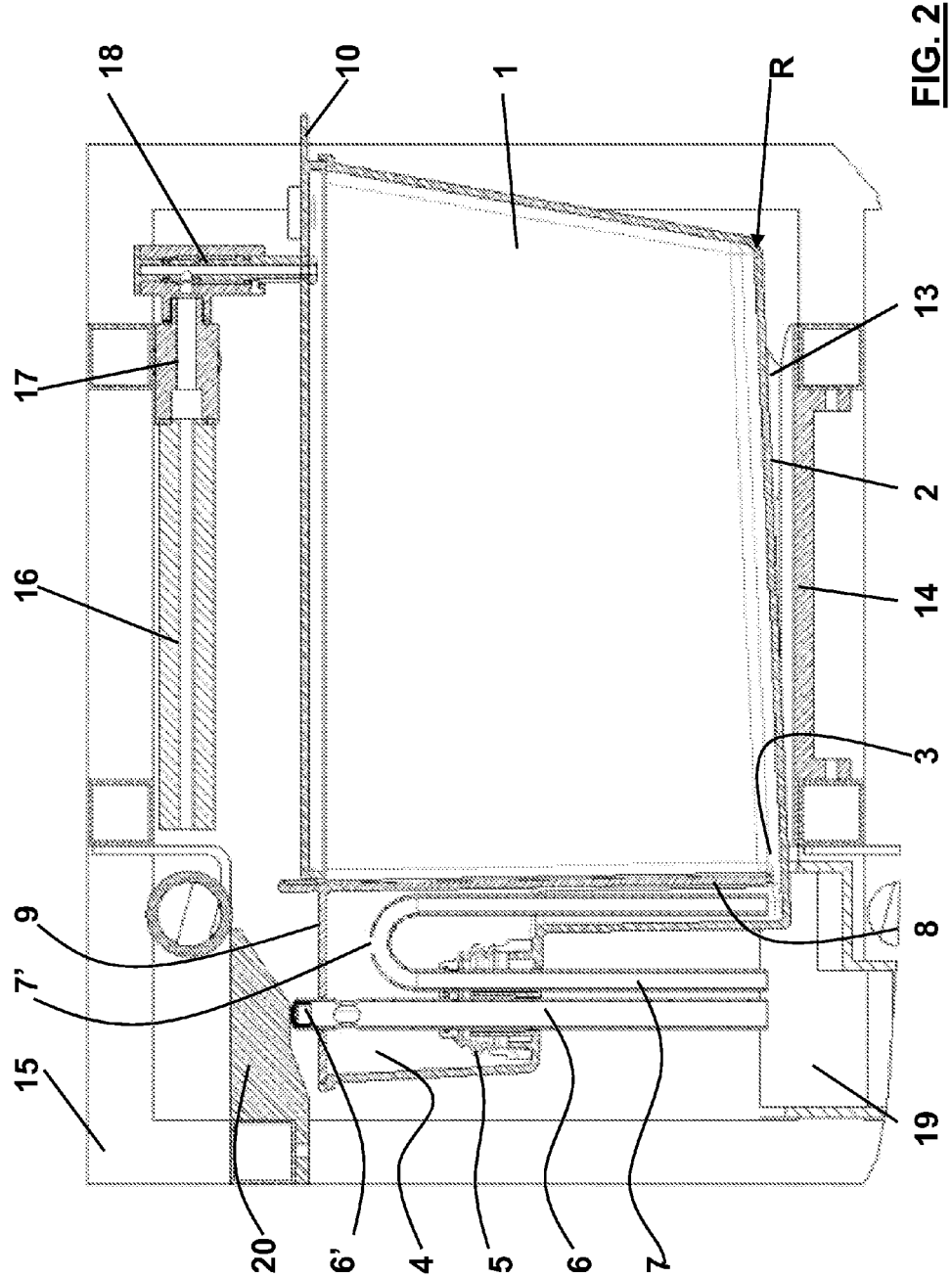
FIG. 2 shows a sectional side view of the basin, according to this invention, when inserted in the housing system.

The basin consists of a housing compartment 1, preferably made of transparent plastic and possibly colored, capable of containing water and animals.

The housing compartment 1 has a specific profile. The bottom 2 consists of a tilted "V-shaped" profile which is used to create a lower point 3 for collecting the organic material to be removed. The side walls are radiused with the bottom and extend upwards.

The front wall is radiused with a given radius of curvature R at the bottom 2 and continues upwards with an extended forward angle of inclination.

In the upper-back part, there is an "equipment compartment" 4; on the bottom of it, there is a hole for housing the drainage device. The equipment compartment has an extension tailpiece in the lower-back part of the housing compartment.

The previously-described profile is optimally radiused with the inlet water flow and the movement resulting from it helps evacuate the organic material. A flow of water is created from the water inlet point, via a faucet 17-18, to the lowest point 3 in order to collect the organic material to be removed.

More specifically, the water inlet point into the basin, hence the position of the faucet 17-18, is determined in order to create a flow of water which washes the radius area R between the front walls and the bottom 2 of the basin. Therefore, the flow of water is deflected towards the lowest point 3, thereby washing the entire area above the bottom 2, in order to carry away organic material efficiently towards said lowest point 3, thus aiding the evacuation.

A rubber bellows 5 is housed in the equipment compartment 4, near the hole; a drainage device, which consists of an "overflow" pipe 6 firmly fixed to a siphon 7, is installed in the bellows. The siphon is in the shape of an inverted U: two portions of the pipe branch out downwards from the top; one portion sucks from the bottom 3 of the basin, whereas the other makes the water flow out of the basin towards the collection system. Around the top of said siphon, there is a small and calibrated hole 7', for example at the highest point. The position and the diameter of the hole 7' determine the water level in the tank.

The housing compartment 1 is separated from the equipment compartment 4 by a partition 8 which is used for keeping the animals inside the housing compartment and letting the water pass into the equipment compartment.

The partition 8 is inserted in special guides located on the internal sides of the basin and can be removed from the top with a handgrip 51.

Figure 5A:
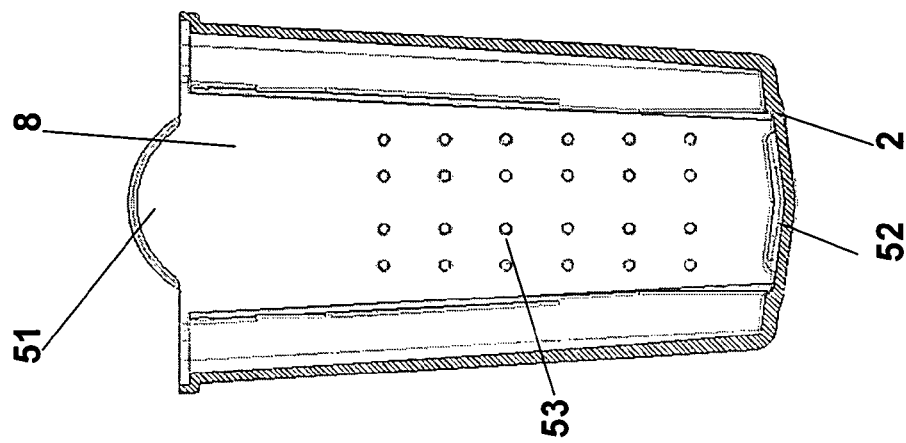
FIGS. 5A and 5B show two alternative forms of embodiment of a partition to be inserted in the basin.
Figure 5B:
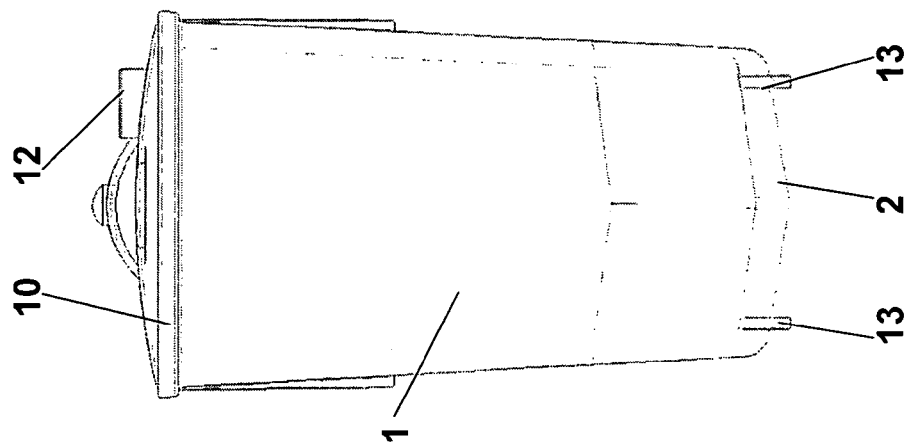

Basically, the partition may have two shapes, as shown in FIGS. 5A and 5B.

The first shape (FIG. 5A) allows communication between the housing compartment 1 and the equipment compartment 4 through a narrow opening 52 located at the lowest point 3 of the bottom of the basin; the size of the opening is such as to prevent the animals from escaping. The narrow opening allows the evacuation of the organic material which settles at the bottom. Furthermore, the partition has holes or slots 53 in it for better water circulation.

This first shape is particularly recommended for animals exceeding a given size which is bigger than the size of the opening, holes or slots.

In the second shape (FIG. 5B), the partition 8 is not provided with a slot at the bottom but it has a profile of its bottom which follows the profile of the basin 2, thereby avoiding communication between the two environments. Furthermore, it is equipped with a central screen 54 which allows the water to pass through it.

This second shape is particularly recommended for very small animals, for example alevins, which would be likely to be sucked in from the bottom of the basin provided with a slot. Furthermore, the screen prevents them from migrating towards the equipment compartment. In this case, the absence of a slot is not a problem because these small animals do not produce organic material to be removed The equipment compartment 4 is provided with a horizontal lid 9 which can be constructively combined with the partition 8. There is an overflow pipe 6 which sticks out and is fit into a hole located on the top horizontal part.

The housing compartment 1 is kept covered at the top by a removable lid 10 which is provided with a hole for letting water in at the front 11 and a hole for supplying the feed 12.

In the lower part of the casing, there are two longitudinal ribs 13 capable of sliding along special guides 14 placed on the housing system, described below.

The basin is designed in a modular way according to different volumes; the various versions have been achieved by changing the width, hence the distance between the two longitudinal ribs according to a given pitch, thereby leaving all the other dimensions unchanged.

In the case of a basin with a pitch which is multiple N of the basic one, there shall preferably be N siphons and N bottoms in the shape of a "V", one for each siphon.

This solution makes it possible to insert basins with different volumes in the housing system without changing the shape of the structure thereof.

The housing system (FIG. 3) is basically made of tubes 15 with shelves placed on special guides 14 regularly spaced from each other lengthwise. The guides can be made of plastic.

The housing system is equipped with a water distribution system 16 which has a number of terminations equal to the maximum configuration of the shelf for the basins having a lower volume.

A faucet 17 is associated with each termination for the flow rate adjustment of the inlet water; downstream of this, there is a piston switch device 18 for delivering or interrupting the water flow.

The part of the housing system facing the rear part of the basins requires a tilted conduit 19 for each shelf which, by means of a tubing system, conveys the discharge water to a drain tank, not shown.

For each position of each basin, the housing system makes use of a "wedge" 20 which enables the functioning of the siphon when the basin is housed, and disables it when it is removed. The wedge 20 is located near the top and at the back of the basin, when inserted in the structure.

When the basin is inserted, the top terminal part 6' of the overflow pipe 6 engages against the wedge 20 and is progressively pushed downwards, thereby enabling the functioning of the siphon. When the basin is removed, the overflow pipe moves up, thereby disabling the siphon.

In addition to having various configurations—both in terms of number of shelves as well as in terms of number of positions in width—the housing system can be configured with a single access, wherein the access to the aligned basins is carried out by only one front access, or with a double access, wherein the access to the basins is carried out in a front-rear access.

The housing system can be connected separately to a dedicated water filtering unit or several housing systems can be connected to a central water filtering system, not shown.

This distinctive feature provides the system with great flexibility in terms of arrangement and adjustment to the various logistic requirements. When operating, the basin (which is filled with water, contains animals and is equipped with all components) is housed on a shelf of the housing system, thereby sliding the lower longitudinal ribs 13 against the guides 14 until crossing a safety latch, thus determining its correct position.

When the basin slides on the guides 14 in the last sliding section, the wedge 20—which is housed integrally with the housing system—interferes with the protruding end 6' of the overflow pipe and makes the drainage device move down, thereby compressing the bellows elastically.

Once the basin is positioned, the piston 18 of the water delivery switch device is lowered by the operator in order to enable the flow which will be centered on the water inlet hole 11 of the lid.

Operating the water delivery piston will make it possible to avoid losing the flow rate adjustment carried out previously as the stopcock is not used for this purpose but it is used separately.

When the piston 18 moves down, it penetrates the hole 11 of the lid, thereby latching the basin.

The siphon is put in motion by increasing the free surface of the water inside the basin. Since the height of suction of the siphon is located near the lowest point of the bottom of the basin, near the narrow opening given by the partition, the water suction from the bottom of the basin will carry away the organic waste that has settled in the meantime.

The suction action of the siphon perfectly integrates with the movement of the water generated by the flow entering along the front wall.

The decrease in the water level uncovers the small hole of the siphon thus sucking in air and determining—depending on the magnitude of the inlet water flow rate—a water suction cyclicity, hence a continuous variation of the level of liquid, or an equilibrium condition in which air is sucked in from the hole and water is sucked in from the suction point of the siphon.

Obviously, if during the introduction of the basin onto the structure, the level of liquid is already high enough, the lowering of the drainage device will immediately operate the siphon.

Removing the basin on the guides 14 in the initial sliding section will cause the drainage device to move up due to the elastic action of the bellows 5 which no longer has the compression action given by the wedge 20.

This upward movement entails disabling the siphon, thereby automatically protecting the operator against unwanted water leakages.

It will be apparent to the person skilled in the art that other alternative and equivalent embodiments of the invention can be conceived and reduced to practice without departing from the true spirit of the invention.

Figure 3:
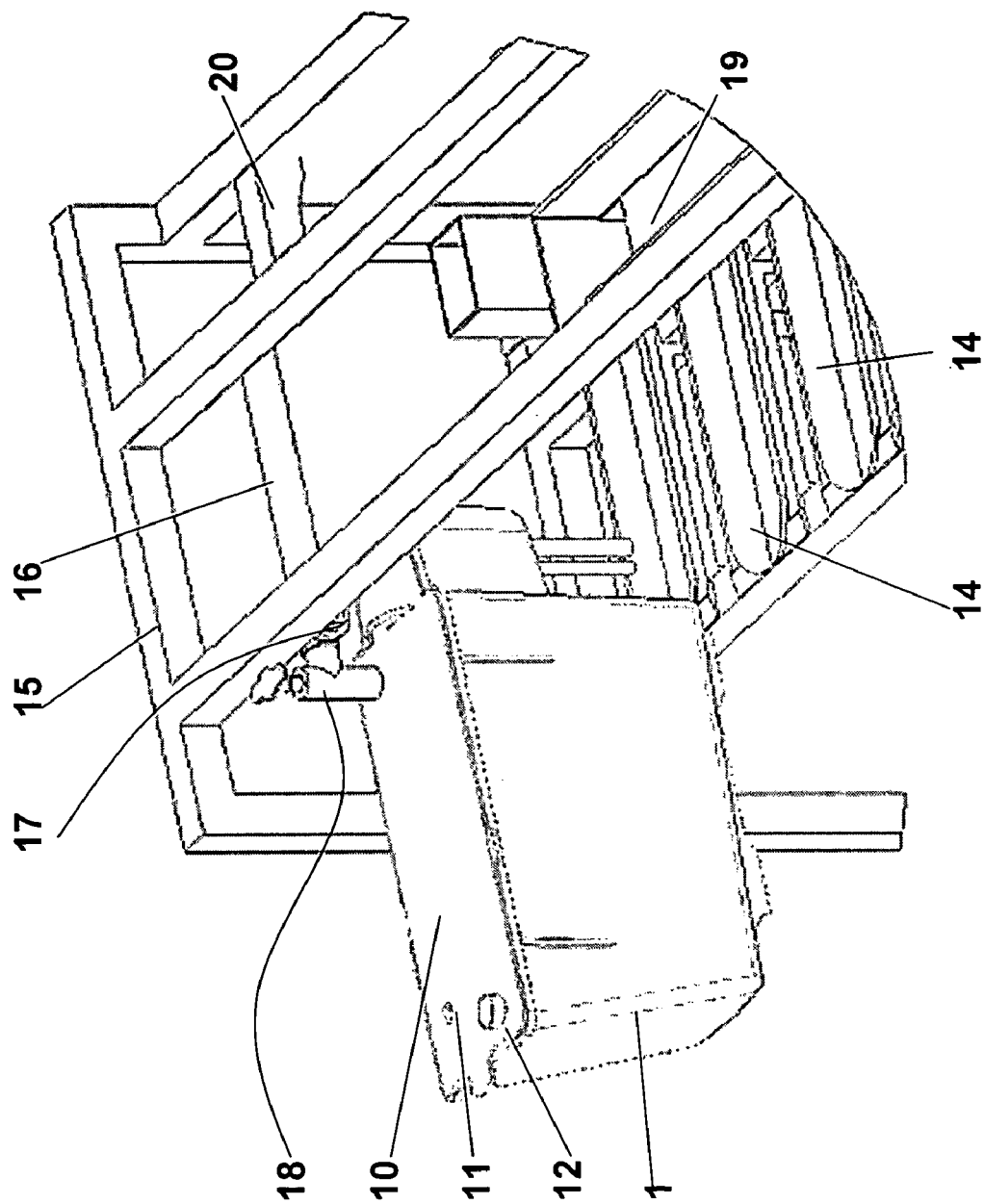
FIG. 3 shows a section plane of the housing system for the basins.
Figure 4:
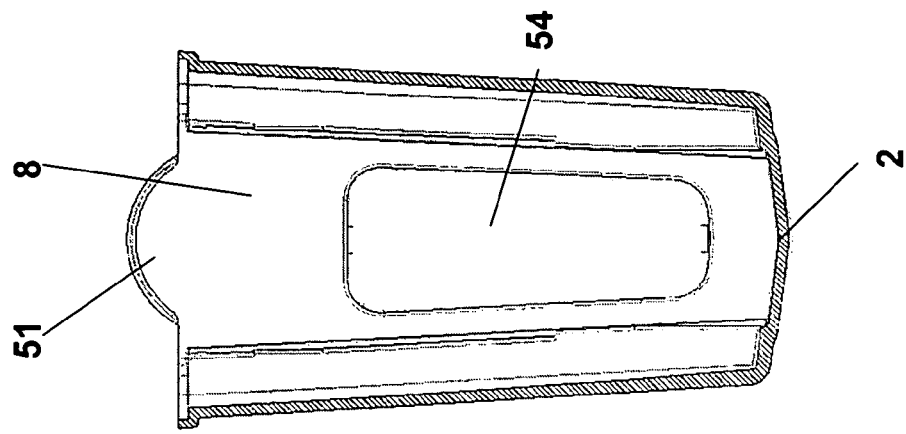
FIG. 4 shows a front view of the basin.

For instance, the guides 14 may not be fixed, as described in FIG. 3, but able to slide on the shelves of the housing system in order to move the basin forward without pulling it out of its guides.

The set of faucet and piston (17, 18) is suitable to be used in a housing system for other kinds of basins containing aquatic animals, than the one described above.

The advantages in connection with the use of this invention are clear.

The comparative tests that have been previously carried out have demonstrated that the effectiveness of the siphon system regarding the cleaning of the basin is far better than other known devices.

The position of the basin within the structure is accurate and repeatable; the housings on the structure are compatible with all the versions of the basin.

The hole in the lid for supplying the feed in the rear zone facilitates the delivery operation.

From the description set forth above it will be possible for the person skilled in the art to embody the invention without introducing any further construction details.

What is claimed is:

1. A basin capable of containing aquatic animals comprising:
    a front housing compartment with a lower point for collecting the organic material to be removed;
    an equipment compartment at the back of the basin, integral to said housing compartment;
    a drainage device, in said equipment compartment, which comprises an "overflow" pipe fixed to a siphon, said siphon comprising a small, calibrated hole arranged approximately at a top of said siphon; said drainage device adapted to assume an upper position and a lower position in said equipment compartment; and,
    a partition between said housing compartment and said equipment compartment, said partition comprising apertures arranged to keep the animals inside the housing compartment and to let a water pass into the equipment compartment, and a bottom opening directly communicating between said housing compartment and said equipment compartment, wherein when said drainage device is in said lower position said drainage device operates said siphon to draw away said water and said organic material through said bottom opening, said equipment compartment has an upper part and an extension tailpiece, said extension tail piece directly facing a lower-back part of said housing compartment and said equipment compartment has a hole at the bottom of said upper part surrounded by a bellows, said drainage device is installed in the bellows and sticks out of the equipment compartment through said hole, said siphon is in the shape of an inverted U, two portions of the siphon branch out downwards from the top, one of which is positioned inside said extension tailpiece and sucks the water from said lowest point of the basin, whereas the other makes the water flow out of the basin through said hole located at the bottom of the equipment compartment.

2. A basin capable of containing aquatic animals, according to claim 1, wherein said housing compartment comprises:
    a bottom having a tilted "V" profile in order to create the said lowest point;
    side walls which are radiused with said bottom and extend upwards, a front wall which is radiused with said bottom and continues upwards with a forward angle of inclination.

3. A basin capable of containing aquatic animals, according to claim 2, wherein the water inlet point into the basin, via a faucet, is determined in order to create a flow of water washing against the area above said bottom, in order to carry away organic material efficiently towards the said lower point, thus aiding the evacuation.

4. A basin capable of containing aquatic animals, according to claim 3, wherein said housing compartment is covered at the top by a removable lid which is provided with a hole at the front for letting water into the basin.

5. A basin capable of containing aquatic animals, according to claim 4, wherein said removable lid comprises a hole for supplying the feed in a front part.

6. A basin capable of containing aquatic animals, according to claim 1, wherein said partition between said housing compartment and said equipment compartment comprises:
   a narrow opening near the said lowest point for allowing communication between said housing compartment and said equipment compartment in order to evacuate the organic material inside the said lowest point;
   holes or slots in its body for better water circulation.

7. A basin capable of containing aquatic animals, according to claim 1, wherein said partition between said housing compartment and said equipment compartment comprises:
   a profile of its bottom which follows the profile of the basin, thereby avoiding communication between said housing compartment and said equipment compartment;
   a central fine mesh screen (54) which allows the water to pass through it and keeps the animals in.

8. A basin capable of containing aquatic animals, according to claim 1, wherein the basin comprises a horizontal lid for said equipment compartment, which has an overflow pipe which sticks out and is fit into a hole.

9. A basin capable of containing aquatic animals, according to claim 1, wherein the basin comprises two longitudinal ribs capable of sliding along special guides in the lower, external part.

10. A housing system for one or more basins according to claim 1, wherein the housing comprises:
    shelves with guides used for housing one or more of said basins;
    a water distribution system with at least one termination for each of the said basins;
    a faucet associated with each termination for the flow rate adjustment of the water going into said basins;
    a piston switch device capable of moving down or up, downstream of each faucet, respectively, in order to deliver or interrupt the water flow;
    a wedge for each position of one or more of said basins, placed near the top and at the back of the basin, when inserted in the housing system.

11. A housing system according to claim 10, wherein when the basin is inserted, the top terminal part of the overflow pipe engages against said wedge and is progressively pushed downwards, thereby enabling the functioning of the siphon, whereas when the basin is removed, said overflow pipe moves up, thereby disabling said siphon.

12. A housing system according to claim 11, wherein it comprises one or more conduits in the rear part for collecting the water coming from the said siphon of each of the said one or more basins.

13. A housing system according to claim 10, wherein the housing compartment of the basin includes a top portion, said top portion is covered by a removable lid comprising a water inlet hole at a front portion of said lid, and once the basin is inserted, said piston of said switch device is lowered and centered on said water inlet hole of the lid, thereby penetrating it and latching the basin.

14. A housing system according to claim 10, wherein said guides are regularly spaced on said shelves, thereby allowing even multiple-width basins to be inserted instead of standard-width basins.

15. A housing system according to claim 10, wherein said guides are fixed or able to slide on said shelves.

16. A housing system according to claim 10, wherein it is configured with a single access, wherein the access to said basins is carried out by only one front access, or with a double access, wherein the access to the basins is carried out in a front-rear access.

17. A housing system according to claim 10, wherein the housing system is connected to a water filtering unit.

* * * * *